United States Patent [19]

Tanaka et al.

[11] Patent Number: 4,740,940
[45] Date of Patent: Apr. 26, 1988

[54] OPTICAL INFORMATION READ APPARATUS

[75] Inventors: Shinichi Tanaka, Kyoto; Haruo Isaka, Hirakata; Yuji Tanaka, Takatsuki, all of Japan

[73] Assignee: Matsushita Electric Industrial Co., Ltd., Osaka, Japan

[21] Appl. No.: 837,287

[22] Filed: Mar. 6, 1986

[30] Foreign Application Priority Data

Mar. 11, 1985 [JP] Japan .................. 60-47925
Jul. 18, 1985 [JP] Japan ................. 60-158965

[51] Int. Cl.$^4$ .............................................. G11B 7/095
[52] U.S. Cl. ........................................ 369/44; 369/46;
369/54; 250/202
[58] Field of Search ..................... 369/44, 46, 54;
250/202; 358/336; 360/38.1

[56] References Cited

U.S. PATENT DOCUMENTS

| 4,006,293 | 2/1977 | Bouwhuis | 369/46 |
|---|---|---|---|
| 4,051,527 | 9/1977 | Braat | 369/46 |
| 4,057,833 | 11/1977 | Braat | 369/44 |
| 4,059,841 | 11/1977 | Bricot | 369/45 |
| 4,193,091 | 3/1980 | Kleuters | 369/44 |
| 4,467,462 | 8/1984 | Shibato | 369/44 |
| 4,497,048 | 1/1985 | Kimura | 369/46 |
| 4,541,082 | 9/1985 | Horikoshi | 369/46 |

FOREIGN PATENT DOCUMENTS 52-93222  8/1977 Japan .
57-74837  5/1982 Japan .
57-181433 11/1982 Japan .

Primary Examiner—Alan Faber
Attorney, Agent, or Firm—Wenderoth, Lind & Ponack

[57] ABSTRACT

An optical information read apparatus for optically reading information recorded on a recording medium includes an optical head for producing two detected signals whose phases vary according to a tracking error of the head, and a tracking error detecting circuit for producing a tracking error signal corresponding to a phase difference between the two detected signals, and a tracking controller for controlling the optical head in response to the tracking error signal. The tracking error detecting circuit has a correlation test circuit for checking a correlation between the states of the two detected signals, and for making the tracking error signal substantially invalid when there is no correlation between the states of the two detected signals. Thus, a stable tracking control can be performed.

28 Claims, 12 Drawing Sheets

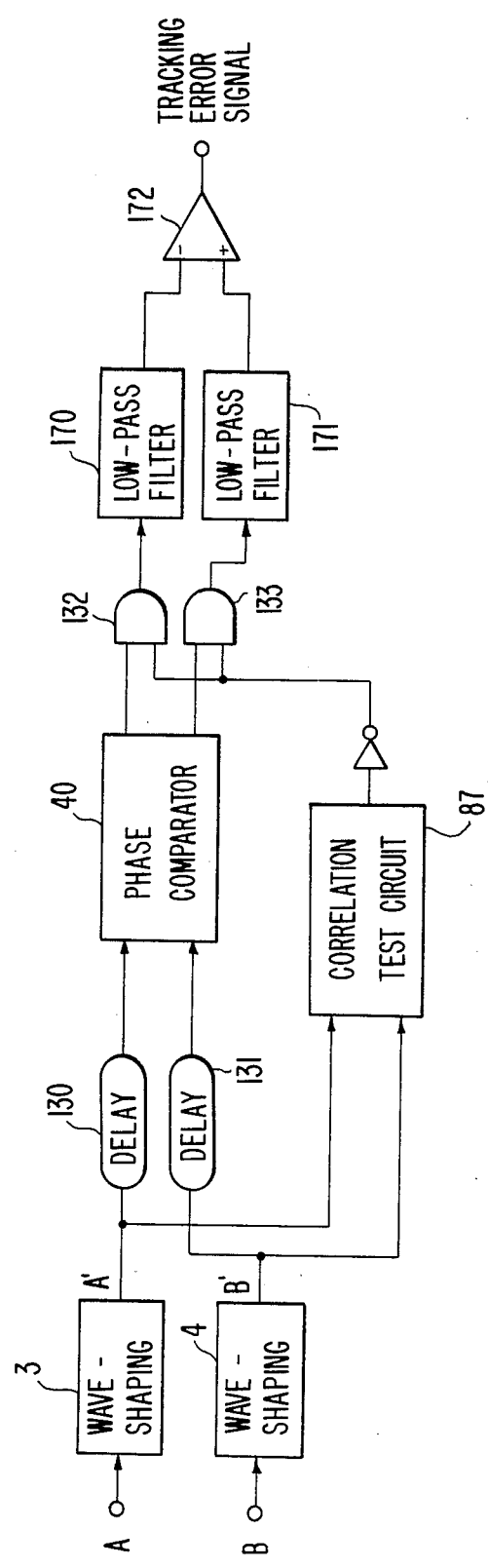
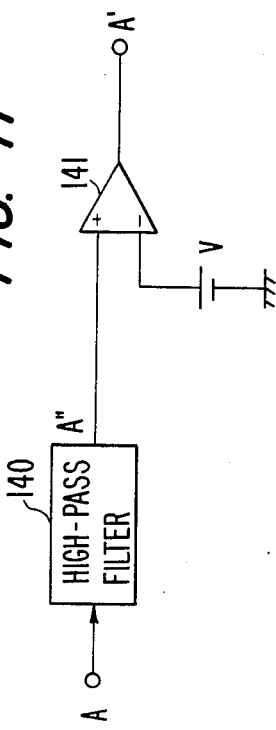

OPTICAL INFORMATION READ APPARATUS

BACKGROUND OF THE INVENTION

1. Field of the Invention

The present invention relates to an optical information read apparatus for optically reading information from a recording medium, and more particularly to a tracking control of the apparatus.

2. Description of the Prior Art

In recent years apparatuses for optically reading information from recording media such as video disk and digital audio disk have been extensively used. These media have microscopically narrow tracks for recording information. In order to read the information from the tracks, accurate tracking control is generally needed. For this purpose, any tracking error is required to be detected. Usually, optical means are utilized to satisfy this requirement. One of such optical means for detecting the tracking error uses the phase difference between two signals produced from an optical head as dislosed in Japanese Laid-Open Patent Application No. 52-93222 corresponding to U.S. Pat. No. 4,057,844. More specifically, an optical head includes a photodetector consisting of four photocells divided by two lines - one being parallel to the information recording tracks, and the other being perpendicular to the tracks. The output signals from the respective two diagonally disposed photocells are added to produce two detected signals. When a tracking error occurs, a phase difference is caused between these two detected signals. The phase difference is obtained by delaying the sum of the two detected signals by $\pi/2$ and then multiplying the delayed result by the difference between the two detected signals. An alternative to this multiplication method is disclosed in Japanese Laid-Open Patent Application No. 57-74837, in which the waveform of the sum of the two detected signals is shaped and then the difference between the two detected signals is sampled at the edges of the shaped waveform to obtain substantially the same result as the above-mentioned Dutch patent. Also, Japanese Laid-Open Patent Application No. 57-181433 discloses a method in which the waveforms of the two detected signals are shaped and the phase differences at the respective edges of the shaped waveforms are directly detected in digital technique.

However, in these conventional methods for detecting the tracking error, when a noise with a large amplitude due to a scratch or other defect on the recording medium is introduced into the output signals from the photodetector, the signal indicating the tracking error is accompanied by a large noise. This poses the problem that the tracking control is made unstable.

SUMMARY OF THE INVENTION

It is an object of the present invention to provide an optical information read apparatus which allows stable tracking control by suppressing noise contained in the tracking error signal due to defects on a recording medium.

The above object is achieved by an optical information read apparatus of the invention comprising: an optical head for producing two detected signals whose phases vary according to a tracking error of the optical head; a tracking error detecting means for producing a tracking error signal corresponding to a phase difference between the two detected signals; and a tracking control means responsive to the tracking error signal for controlling the optical head, wherein the tracking error detecting means has a means which checks a correlation between the states of the two detected signals and makes the tracking error signal substantially invalid when there is no correlation between the states of the two detected signals. Here the correlation between the states of the two detected signals means whether one of the two detected signals inverts its state when the other inverts its state within a reasonable time period. In other words, if both of the two detected signals invert their state from their normal states and thereafter return to the normal states, there is a correlation between the states of the two detected signals. If one of the two detected signals inverts its state from the normal state and thereafter returns to the normal state while the other of the two detected signals remains in the normal state, there is no correlation between the states of the two detected signals.

In the above structure, even if a noise with a large amplitude caused by a defect such as a scratch on a recording medium is introduced into the two detected signals from the optical head, the tracking control is prevented from becoming disordered. When the large noise is introduced into the detected signals, the detected light is usually scattered to a large extent. This makes the correlation between the two detected signals to be lost. The present invention detects this lost correlation and eliminate the noise from the detected signals thereby to assure stable tracking control.

The above and other objects and features of the invention will become apparent from the following description taken in connection with the accompanying drawings in which:

BRIEF DESCRIPTION OF THE DRAWINGS

FIG. 10, consisting of A and B, is a block diagram of a still further example of the tracking error detecting circuit in the embodiment of FIG. 1;

FIG. 11 is a circuit diagram of a wave-shaping circuit used in the above tracking error detecting circuits;

DESCRIPTION OF THE PREFERRED EMBODIMENTS

Figure 15:
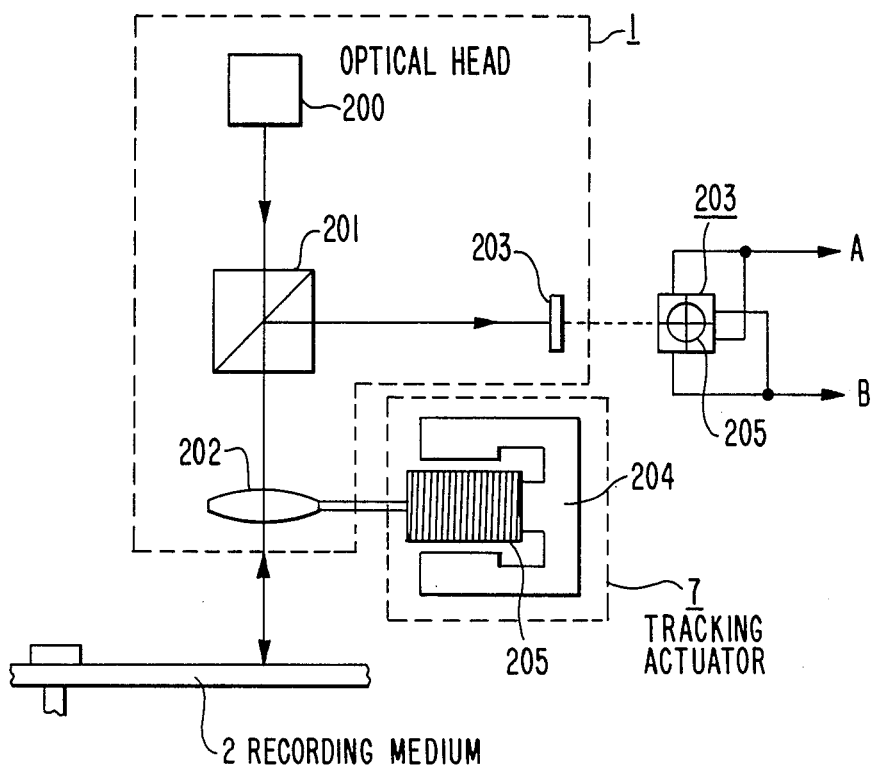
FIG. 15 is a schematic structural diagram showing a typical optical head for producing the two detected signals and a typical tracking actuator.

FIG. 15 shows a typical known optical head and a typical known tracking actuator which are applicable to the optical information read apparatus of the invention. The optical head 1 comprises a light source 200, a beam splitter (or a half mirror) 201, an object lens 202, and a photodetector 203. A light beam radiated by the light source 200 such as a laser diode passes through the beam splitter 201 and focused by the object lens 202 onto a recording medium 2 where the light beam is reflected. The reflected light beam from the recording medium 2 is reflected by the beam splitter 201 and forms a light spot 205 on the photodetector 203. The photodetector 203 is divided into four photoreceptive cells each of which produces a current corresponding to a part of the light spot which it receives. Output currents of respective two cells which are positioned diagonally to each other are added to obtain two detected signals A and B. When a tracking error occurs, a phase difference will be produced between the two detected signals A and B. A tracking actuator 7 comprises a magnetic circuit 204 and a movable coil 205 and electromagnetically actuates the object lens 202 in response to a tracking control signal.

Figure 1:
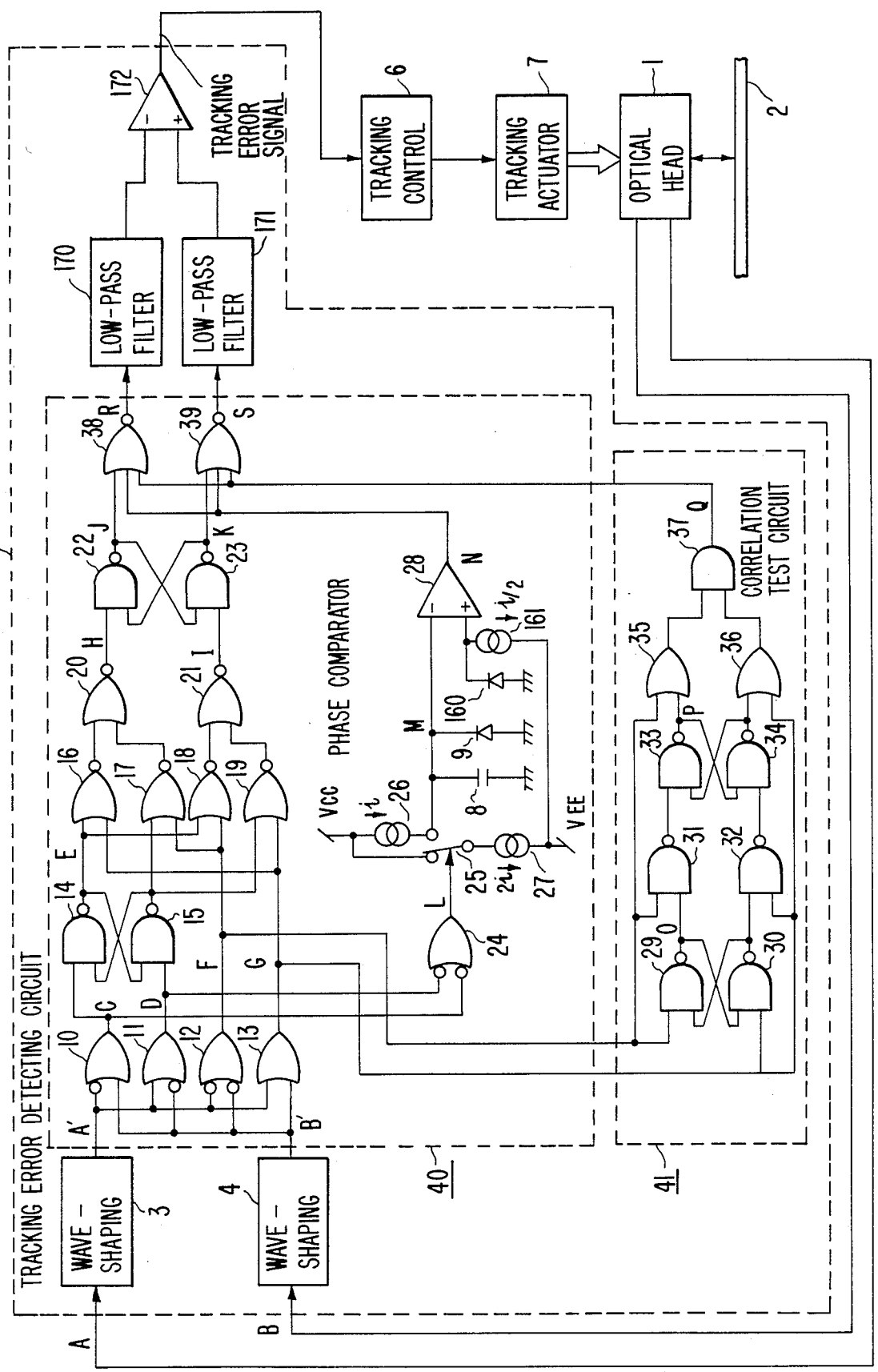
FIG. 1 is a circuit diagram of an embodiment of the invention.

FIG. 1 shows an embodiment of the optical information read apparatus according to the invention. The optical head 1 receiving a reflected light from the recording medium 2 produces two detected signals A and B. A tracking error detecting circuit 5 produces a tracking error signal from the two detected signals A and B. A tracking control circuit 6 is responsive to the tracking error signal to produce a tracking control signal. A tracking actuator 7 is responsive to the tracking control signal to actuate the optical head 1. The tracking control circuit 6 may be any known control circuit comprising an amplifier and a filter. The optical head 1 may produce two signals which cause a phase difference corresponding to a tracking error and may be any known optical head as, for example, disclosed in U.S. Pat. No. 4,059,841. The tracking actuator 7 may be any known actuator as, for example, disclosed in U.S. Pat. No. 4,193,091.

The tracking error detecting circuit 5 detects the phase difference between the two detected signals A and B and produces the tracking error signal. The detecting circuit 5 includes wave-shaping circuits 3 and 4, a phase comparator 40, and a correlation test circuit 41. The wave-shaping circuits 3 and 4 remove low-frequency components from the signals A and B, and compares the resulting signals with ground potential to shape their waveforms to obtain two digital detected signals A' and B'. The phase difference between the signals A' and B' is detected by the phase comparator 40. The correlation test circuit 41 performs to ascertain whether a correlation exists between the states of the digital detected signals A' and B'.

Figure 2:
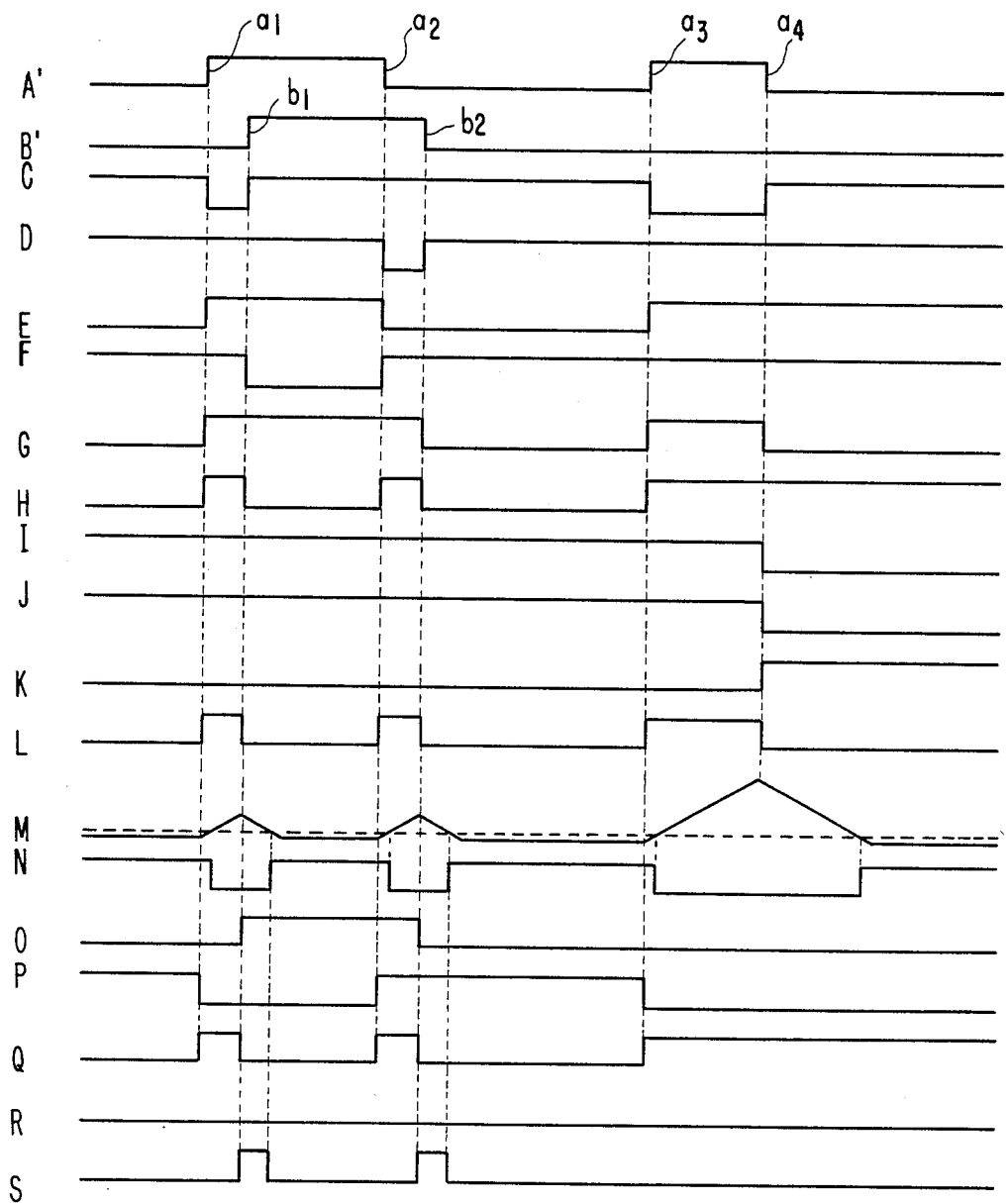
FIG. 2, consisting of A', B' and C-S, is a signal waveform diagram for illustrating the operation of the embodiment of FIG. 1.

The waveforms of signals at various portions in the apparatus of FIG. 1 are shown in FIG. 2. Waveforms A'-R are obtained at portions A'-R in FIG. 1, respectively. It is to be noted that in the description below, "high" and "low" potentials of each digital signal are represented by "H" and "L", respectively. The waveforms of the signals A and B delivered from the optical head 1 are shaped by the wave-shaping circuit 3 and 4 to produce the digital signals A' and B' as shown. The signal A' is successively inverted at $a_1$, $a_2$, $a_3$ and $a_4$. The signal B' is successively inverted at $b_1$ and $b_2$.

First, the operation of the phase comparator 40 will be described. OR gates 10, 11, 12 and 13 produce signals C, D, F and G, respectively. When the signals A' and B' are respectively "H" and "L", "L" and "H", "H" and "H", or "L" and "L", each of the signals C, D, F and G becomes "L" state. Therefore, a first flip-flop consisting of NAND gates 14 and 15 is set when the signal A' is "H" state and the signal B' is "L" state, so that the output signal E of the NAND gate 14 goes to "H" state. When the signal A' is "L" state and the signal B' is "H" state, the first flip-flop is reset, so that the signal E goes to "L" state. NOR gates 16, 17, 18, 19, 20 and 21 form a combinational logic circuit that performs a check to see which one of the signals A' and B' leads the other, based on the state of the first flip-flop and the combination of the present states of the output signals of the OR gates 10-13. More specifically, after the signals A' and B' take different states, if one of them inverts its present state, then it is judged that the inverted one lags the other. For example, if both of the signals A' and B' are in "L" state, and if the signal A' leads B', then the signal A' goes to "H" state first, setting the first flip-flop. This causes the signal E to go to "H" state. Subsequently, the signal B' goes to "H" state, so that both of the signals A' and B' will take "H" state, allowing the output signal of the NOR gate 17 go to "H" state. Thus, the output signal H of the NOR gate 20 goes to "L" state, so that a second flip-flop consisting of NAND gates 22 and 23 is set, allowing the output signal J of the NAND gate 22 go to "L" state. Oppositely, if the signal B' leads A', the second flip-flop is reset, allowing the output signal K of the NAND gate 23 go to "L" state.

When the signals A' and B' are in different states, the output signal L of an OR gate 24 is "H" state to thereby bring a switch 25 into contact with the left side terminal so that a capacitor 8 is charged by a current (i) supplied from a current source 26. Thus, the voltage signal M across the capacitor 8 increases linearly. Since the signals A' and B' are maintained in different states for a period of time corresponding to the phase difference, the signal M reaches a level corresponding to the phase difference. When the signals A' and B' again become the same state, the signal L goes to "L" state thereby to turn the switch 25 into contact with the right side terminal. Since a current source 27 drains a current (2i) twice the current (i) supplied by the current source 26, the capacitor 8 is discharged with the same current as was used during the charge operation. As a result, the level of the signal M drops linearly until it is limited by a diode 9, whereupon the decrease of the level stops. The signal M is compared by a comparator 28 with a threshold level slightly higher than the level to which the signal M is limited. This threshold value can be obtained by flowing by a current source 161 a current, say i/2, that is less than the current (i) of the current source 26 through a diode 160 similar to the aforementioned diode 9, as shown. Thus, the signal M maintains higher level than the threshold level for a time about twice the time for which the signal L is maintained in "H" state. During this time interval, the output signal N of the comparator 28 is kept in "L" state.

As can be understood from the above description, if one—B', for example—of the signals A' and B' is inverted from its normal state, while the other (A') remains in its normal state, the time period for which they remain in the different states is taken as the phase difference. Then, if the signal B' is returned to the normal state, producing the identical states again, the signal B' will immediately thereafter be judged to lag the signal A'. As the result, the signals K and N are maintained in "L" state for a time approximately corresponding to the phase difference. Oppositely, if the signal A' is inverted and then returned to the normal state while the signal B' is unchanged, the signal A' is judged to lag the signal B'. As the result, the signals J and N are maintained in "L" state for a time substantially corresponding to the phase difference. In this way, the phase difference between the signals A' and B' is detected.

In FIG. 2, the transitions $a_1$ and $a_2$ of the signal A' correspond to the transitions $b_1$ and $b_2$, respectively, of the signal B', which means there is a correlation between the states of the signals A' and B' in this time period. Accordingly, if a pulse corresponding to the phase difference obtained during this time period is produced, this pulse this can be used as a tracking error signal.

However, the transitions $a_3$ and $a_4$ of the signal A' have no counterparts of the signal B'. Therefore, no correlation exists between the signals A' and B' during this time period, but a pseudo phase difference is detected. The correlation test circuit 41 acts to prevent a tracking error signal from being produced corresponding to the pseudo phase difference.

The correlation test circuit 41 will now be described. A third flip-flop consisting of NAND gates 29 and 30 is set when both of the signals A' and B' are "H" states, allowing the output signal O of the NAND gate 29 go to "H" state. When both of the signals A' and B' are "L" states, the third flip-flop is reset, allowing the signal O go to "L" state. After the signals A' and B' are "H" states, if any one of them inverts this state, the output signal of a NAND gate 31 goes to "L" state, setting a fourth flip-flop consisting of NAND gates 33 and 34. The output signal P of the NAND gate 33 then goes to "H" state. Oppositely, if any one of the signals A' and B' inverts its state when they are "L" states, the output signal of a NAND gate 32 goes to "L" state, resetting the fourth flip-flop, so that the signal P goes to "L" state. When both of the signal A' and the signal B' are inverted from their original identical states (the correlation exists), either an OR gate 35 or 36 goes to "L" state, causing the output signal Q of an AND gate 37 to go to "L" state. In this state, therefore, when either the signal J or K goes to "L" state and the signal N goes to "L" state, the output signal R or S of an OR gate 38 or 39 is maintained in "H" state during a period corresponding to the phase difference.

However, if the signals A' and B' take the same state and then only one of them is inverted twice consecutively (the correlation does not exist), the output signals of the OR gates 35 and 36 are kept in "H" state. Also, the signal Q is maintained in "H" state. Consequently, neither the OR gate 38 nor 39 produces a pulse corresponding to the phase difference.

Low-pass filters 170 and 171 operate as ripple filters for obtaining average values of the signals R and S, respectively. A differential amplifier 172 produces the tracking error signal from the output signals of the low-pass filters 170 and 171.

As described thus far, the tracking error detecting circuit 5 produces a tracking error signal corresponding to the phase difference between the two digital detected signals A' and B' detected during the time period in which there is a correlation between the states of the signals A' and B', but eliminates a signal corresponding to the pseudo phase difference detected when there is no correlation between the states of the signals A' and B' thereby eliminating false tracking error signals. Accordingly, even when a defect such as a scratch exists on the recording medium, stable tracking control can be performed.

Figure 3:
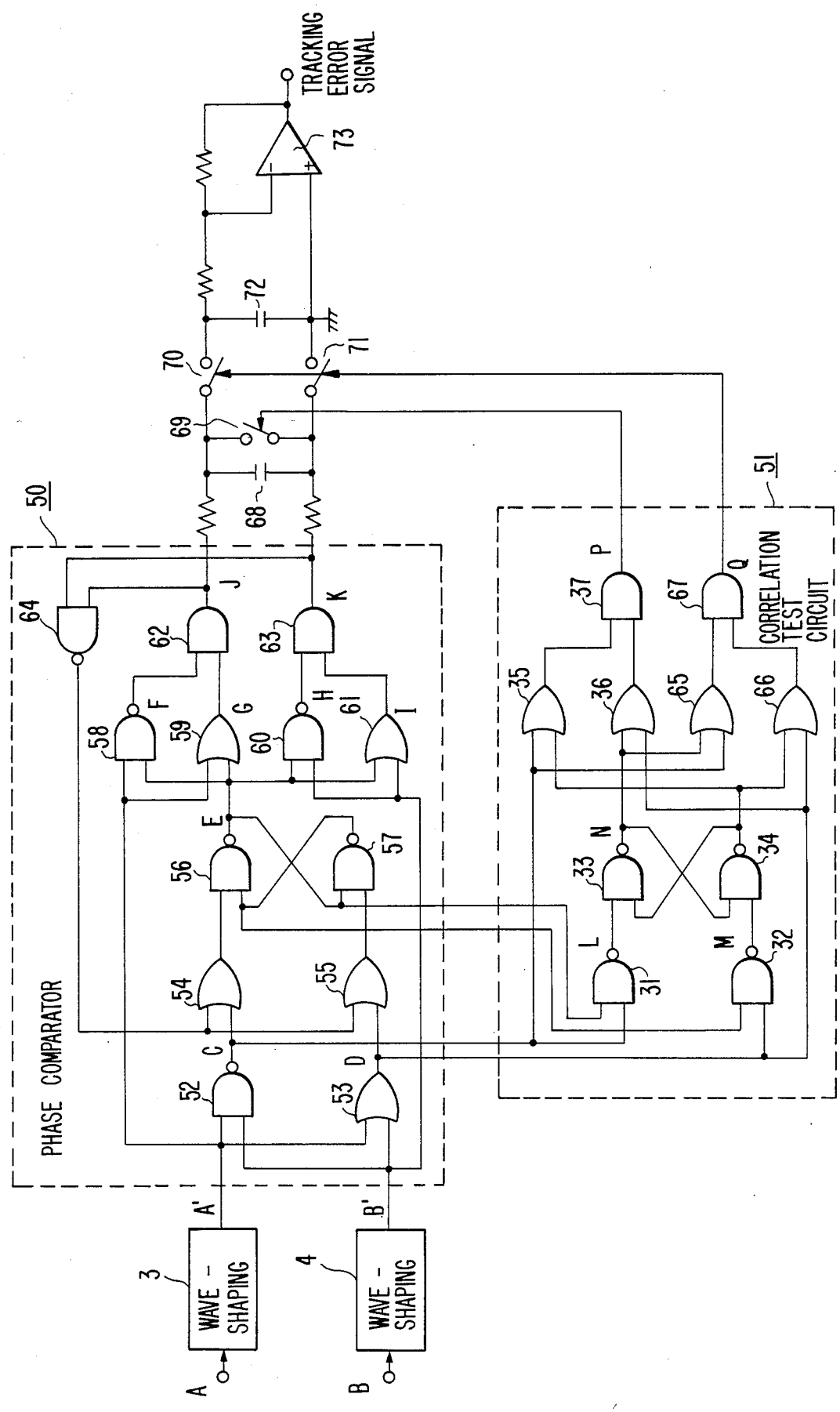
FIG. 3 is a circuit diagram of another example of a tracking error detecting circuit in the embodiment of FIG. 1.
Figure 4:
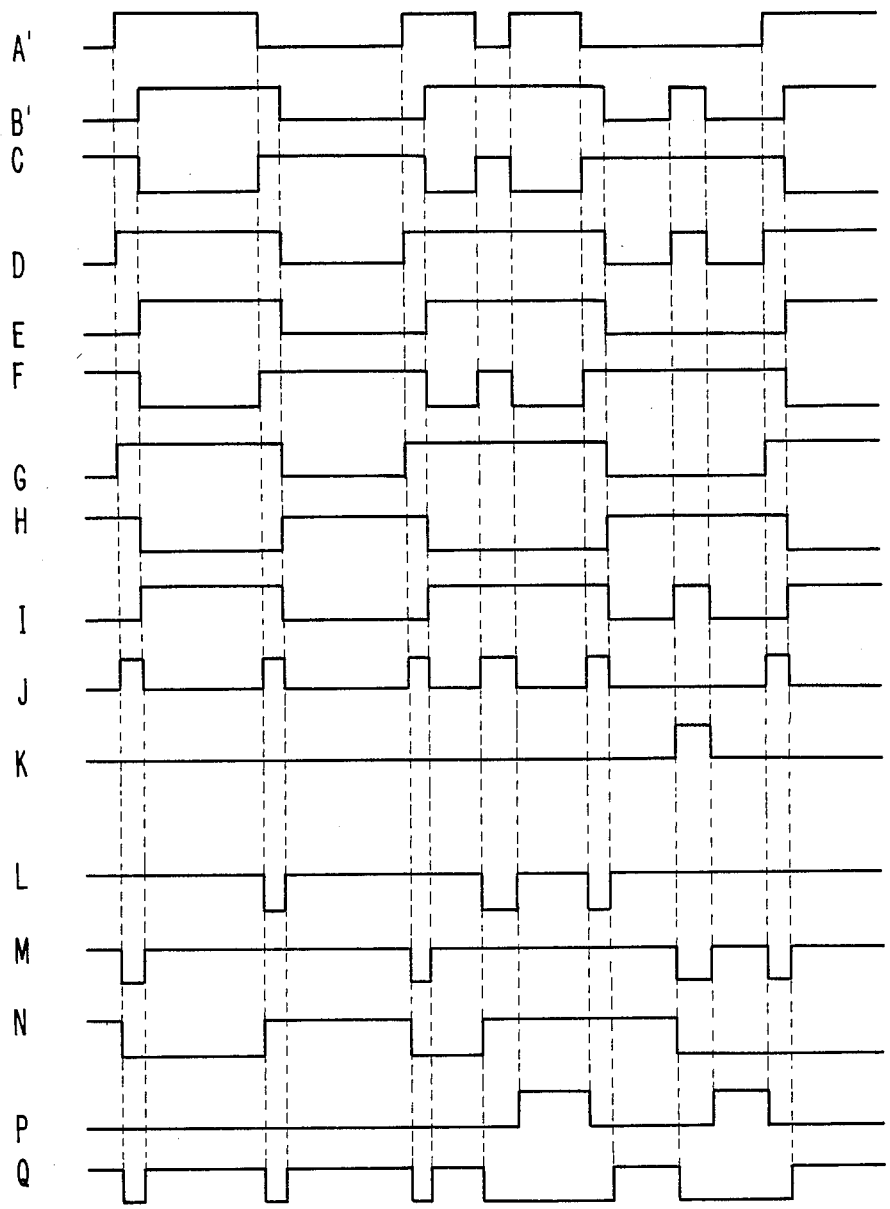
FIG. 4 is a signal waveform diagram for illustrating the operation of the circuit shown in FIG. 3.

FIG. 3 shows another configuration of the tracking error detecting circuit 5. In this figure, a phase comparator 50 functions in the same way as the phase comparator 40 shown in FIG. 1. A correlation test circuit 51 has somewhat wider function than that of the correlation test circuit 41 shown in FIG. 1. FIG. 4 shows the waveforms of signals appearing at points A'-Q in the circuit shown in FIG. 3. The operation of the circuit shown in FIG. 3 will hereinafter be described. First, the operation of the phase comparator 50 will be described. It is assumed that the digital detected signals A' and B' have waveforms as shown in FIG. 4. If the output signal of a NAND gate 64 is in "L" state, when both of the signals A' and B' are "H" states, the output signal C of a NAND gate 52 goes to "L" state, so that a flip-flop consisting of NAND gates 56 and 57 is set, allowing the output signal E of the NAND gate 56 go to "H" state. When both of the signals A' and B' are "L" state, the output signal of an OR gate 53 becomes "L" state, so that the flip-flop is reset, allowing the signal E go to "L" state. NAND gates 58, 60, OR gates 59, 61 and AND gates 62, 63 form a combinational logic circuit. When both of the signals A' and B' are the same state, and thereafter the signal A' inverts its state, the output signal J of the NAND gate 62 goes to "H" state. When both of the signals A' and B' are the same state, and thereafter the signal B' varies to its inverted state, the output signal K of the NAND gate 63 goes to "H" state. If both of the signals J and K go to "H" states, they are fed back to OR gates 54 and 55 by the NAND gate 64. This causes the signals J and K to return to "L" state. As a result, when the signal A' leads the signal B', the time period during which the signal J is maintained in "H" state is longer than the time period during which the signal K remains in "H" state. When the signal B' leads the signal A', the above situations of the signals J and K will be reversed. Accordingly, the difference between the signals J and K gives the phase difference between the signals A' and B'. The signals J and K are fed back to the OR gates 54 and 55 by the NAND gate 64 so that both of the signals J and K can fully rise upon the transitions. Therefore, the circuit will respond completely faithfully to even a minute phase difference, eliminating existence of a dead zone.

The operation of the correlation test circuit 51 will next be described. In this circuit, the components with the same reference numerals as those of the correlation test circuit 41 of FIG. 1 operate in the same manner as the latter. The correlation test circuit 51 differs from the correlation test circuit 41 in the addition of OR gates 65, 66, and an AND gate 67. When there is a correlation between the states of the signals A' and B' as described before, the output signal Q of the AND gate 67 goes to "L" state, indicating the correlation.

Further, in the circuit of FIG. 3, when the phase comparator 50 delivers pulses corresponding to the phase difference, a capacitor 68 integrates them, whereby a value corresponding to the phase difference is stored in the capacitor 68 in the form of electric charge. During this time, switches 69, 70 and 71 are opened. When the phase comparison made upon the inversions of the two digital signals A' and B' is completed and the correlation test circuit 51 determines that the correlation exists between the signals A' and B', the signal Q goes to "L" state, thereby closing the switches 70 and 71. Thus, the electric charge is transferred from the capacitor 68 to another capacitor 72. In order to achieve wasteful transfer of the charge, it is desired that the electrostatic capacitance of the capacitor 72 be set sufficiently larger than that of the capacitor 68. On the other hand, when it is determined that there is no correlation between the signals A' and B' when one of them is inverted twice, the signal P goes to "L" state, thereby closing the switch 69. As a result, the capacitor 68 is discharged. Accordingly, a tracking error signal is produced only when there is a correlation between the states of the two digital detected signals A' and B'. The signal charged by the capacitor 72 is amplified by a differential amplifier 73 to be a tracking error signal.

In the circuits shown in FIGS. 1 and 3 described above, the phase difference between the two detected signals (A, B) from the optical head is detected by digital phase comparison of the wave-shaped digital detected signals (A', B'). But, is also possible to detect the phase difference directly from the detected signals A, B without shaping their waveforms. An example of such tracking error detecting circuit shown in FIG. 5 will next be described.

Figure 5:
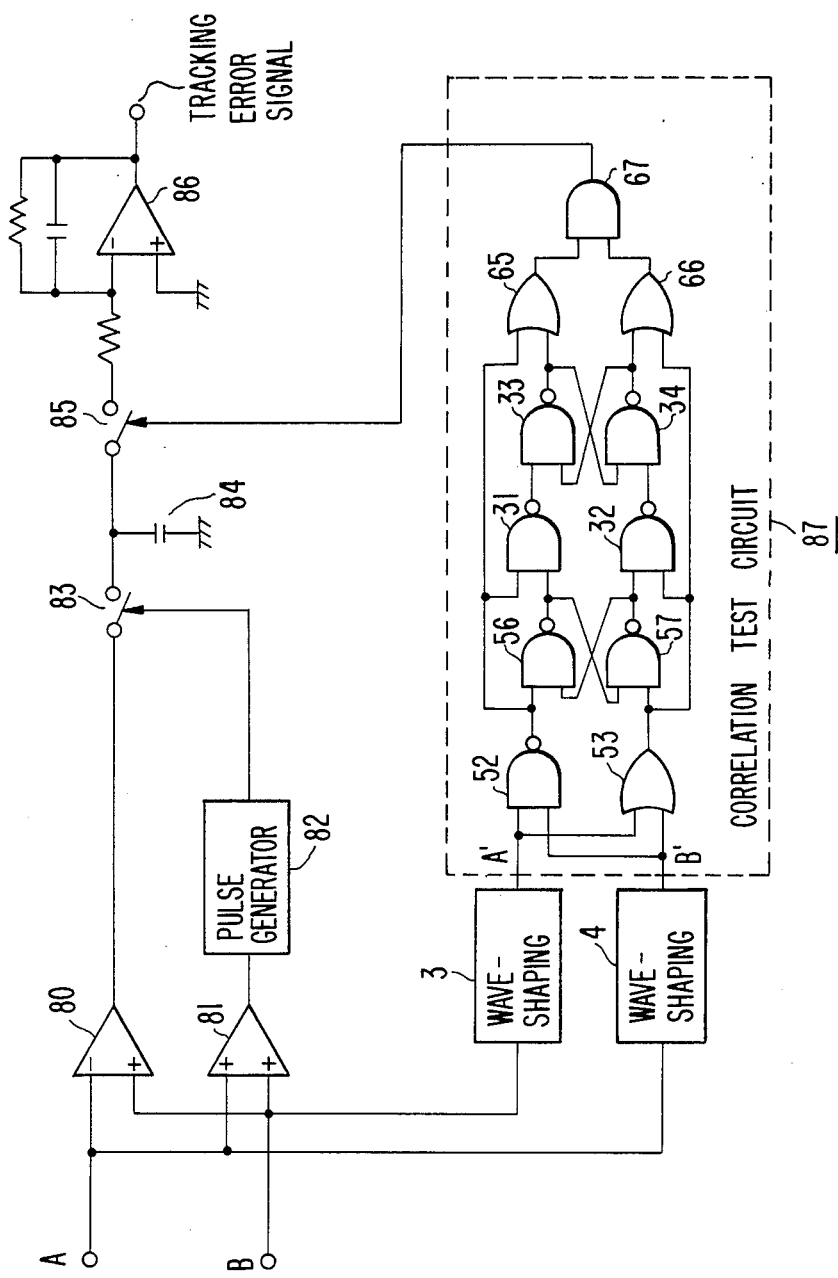
FIG. 5 is a circuit diagram of a further example of the tracking error detecting circuit in the embodiment of FIG. 1.

Referring to FIG. 5, a subtractor 80 produces the difference signal between the signals A and B delivered from the optical head. An adder 81 produces the sum signal of the signals A and B. An edge-triggered pulse generator 82 produces a pulse at a leading or trailing edge of the sum signal. Whenever a pulse is delivered from the pulse generator 82, a switch 83 is closed to allow the difference signal to be sampled and held by a capacitor 84. The held value corresponds to the phase difference between the signals A and B, because the phase difference between the sum and difference signals of the two signals which are identical in amplitude but out of phase is $\pi/2$, and the amplitude of the difference signal varies according to the phase difference (as taught by Japanese Laid-Open Patent Application No. 57-74837). A correlation test circuit 87 operates similarly to the correlation test circuits 41 and 51 shown in FIGS. 1 and 3. Immediately after the correlated inversions of the two digital detected signals A' and B', the output signal of the AND gate 67 goes to "L" state, thereby closing a switch 85. The signal sampled and held by the capacitor 84 is outputted as a tracking error signal via a filter amplifier 86.

In any of the tracking error detecting circuits described above, a tracking error signal is produced according to the phase difference detected from correlated inversions of the two detected signals, but no tracking error signal is produced according to the phase difference detected from non-correlated inversions of the two detected signals. But, it is also possible to produce a tracking error signal whenever a phase difference detected from any inversions of the two detected signals and to later cancel the tracking error signal produced according to the phase difference detected from non-correlated inversions.

Figure 6:
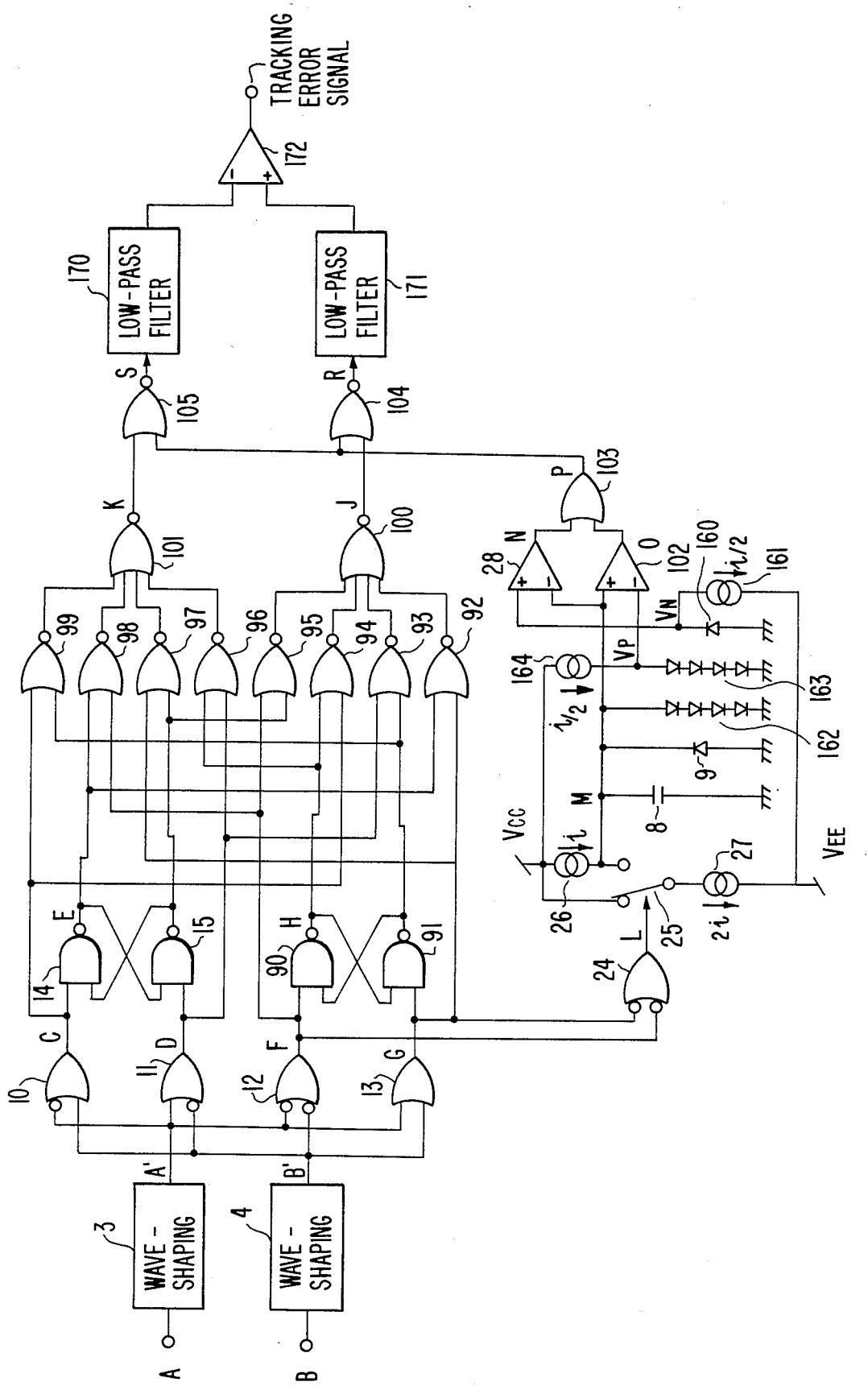
FIG. 6, consisting of A and B, is a circuit diagram of still another example of the tracking error detecting circuit in the embodiment of FIG. 1.
Figure 7:
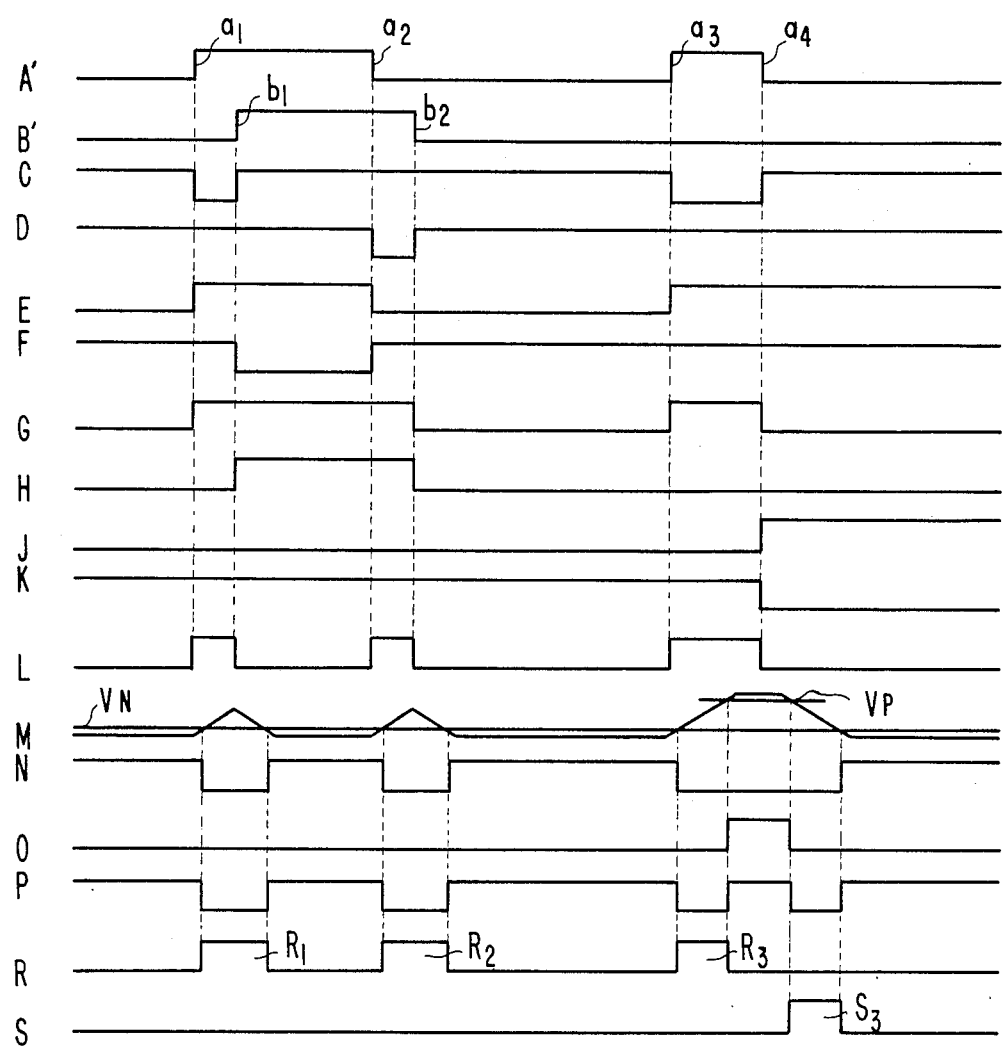
FIG. 7 is a signal waveform diagram for illustrating the operation of the aircuit shown in FIG. 6.

FIG. 6 shows one example of such a tracking error detecting circuit. FIG. 7 shows waveforms at respective portions of the circuit of FIG. 6. The OR gates 10, 11, 12, 13 and the flip-flop consisting of the NAND gates 14, 15 operate in the same manner as the circuit shown in FIG. 1. When the signal A' is "H" state and the signal B' is "L" state, the flip-flop is set, so that the output signal E of the NAND gate 14 goes to "H" state. When the signal A' is "L" state and the signal B' is "H" state, the flip-flop is reset, so that the signal E goes to "L" state. When both of the signals A' and B' are in "H" states, a second flip-flop consisting of NAND gates 90 and 91 is set, so that the output signal H of the NAND gate 90 goes to "H" state. When both of the signals A' and B' are "L" states, the second flip-flop is reset, so that the signal H goes to "L" state. NOR gates 92-101 form a combinational logic circuit that determines which one of the signals A' and B' leads the other from the contents of the flip-flops and the combination of the present output states of the OR gates 10, 11, 12, 13. When the signal A' first inverts its present state from the state that the both signals A' and B' are in the same state, or when the signal B' first inverts its present state from the state that the signals A' and B' are in different states, the signal A' is judged to leads the signal B'. In this case, the output signal J of the NOR gate 100 goes to "L" state. On the other hand, when the signal B' first inverts its present state from the state that the both signals A' and B' are in the same state, or when the signal A' first inverts its present state from the state that the signals A' and B' are in different states, the signal B' is judged to lead the signal A'. In this case, the output signal K of the NOR gate 101 goes to "L" state.

The OR gate 24, switch 25, current sources 26, 27 and 161, and comparator 28 operate in the same manner as the circuit shown in FIG. 1. The capacitor 8 is charged or discharged depending on the output signal L of the OR gate 24. When the capacitor 8 is discharged, the lower level of the signal M is limited by the diode 9 in the same way as in the case of FIG. 1. When the capacitor 8 is charged, the higher level of the signal M is limited by a diode array 162. The signal M is compared with a reference level $V_n$ slightly higher than its lower limit level by the comparator 28. Also, the signal M is compared with a reference level $V_p$ slightly lower than its higher limit level by a comparator 102. The reference level $V_n$ is produced by the diode 160 and the current source 161, and the reference level $V_p$ is produced by a diode array 163 and a current source 164. Thus, when the charging of the capacitor 8 is started, first the output signal N of the comparator 28 becomes "H" state, and the output signal O of the comparator 102 becomes "L" state. Since the signal M immediately exceeds the reference level $V_n$, both of the signals N and O will become "L" state. As the signal M further increases beyond the reference level $V_p$, the signal O goes to "H" state. Thereafter, the signal M immediately reaches the higher limit level, and the charging operation is stopped.

Accordingly, during almost the whole period in which the capacitor 8 is being charged, both of the signals N and O are "L" state, and the output signal P of an OR gate 103 is "L" state. Also, during almost the whole period in which the capacitor 8 is being discharged, the signal P becomes "L" state. Therefore, when, from the state that the two digital detected signals are in the same state, one of them is inverted and thereafter the other is inverted, a same digital detected signal is judged to lead the other at either of the transitions. Therefore, either the signal J or K is always "H" state, so that either the output signal R of an OR gate 104 or the output signal S of an OR gate 105 is "H" state during the period in which the capacitor 8 is being charged or discharged. $R_1$ and $R_2$ in FIG. 7 are pulses produced in this case. However, when, from the state that the two digital detected signals are in the same state, one of them is inverted twice consecutively, one signal is judged to lead the other at the first transition, and the other signal is judged to lead the one signal at the second transition. At the second transition, the signals J and K are inverted. Therefore, when the capacitor 8 is charged, one of the signals R and S is "H" state, and, when the capacitor is discharged, the other is "H" state. As a result, at these transitions, the signals R and S alternately appear as pulses of same duration. $R_3$ and $S_3$ in FIG. 7 are the pulses produced in this case. Since a differential amplifier 106 produces the difference between these two signals R and S as a tracking error signal, the pulses $R_3$ and $S_4$ are cancelled each other, so that no false tracking error signal is outputted.

Figure 8:
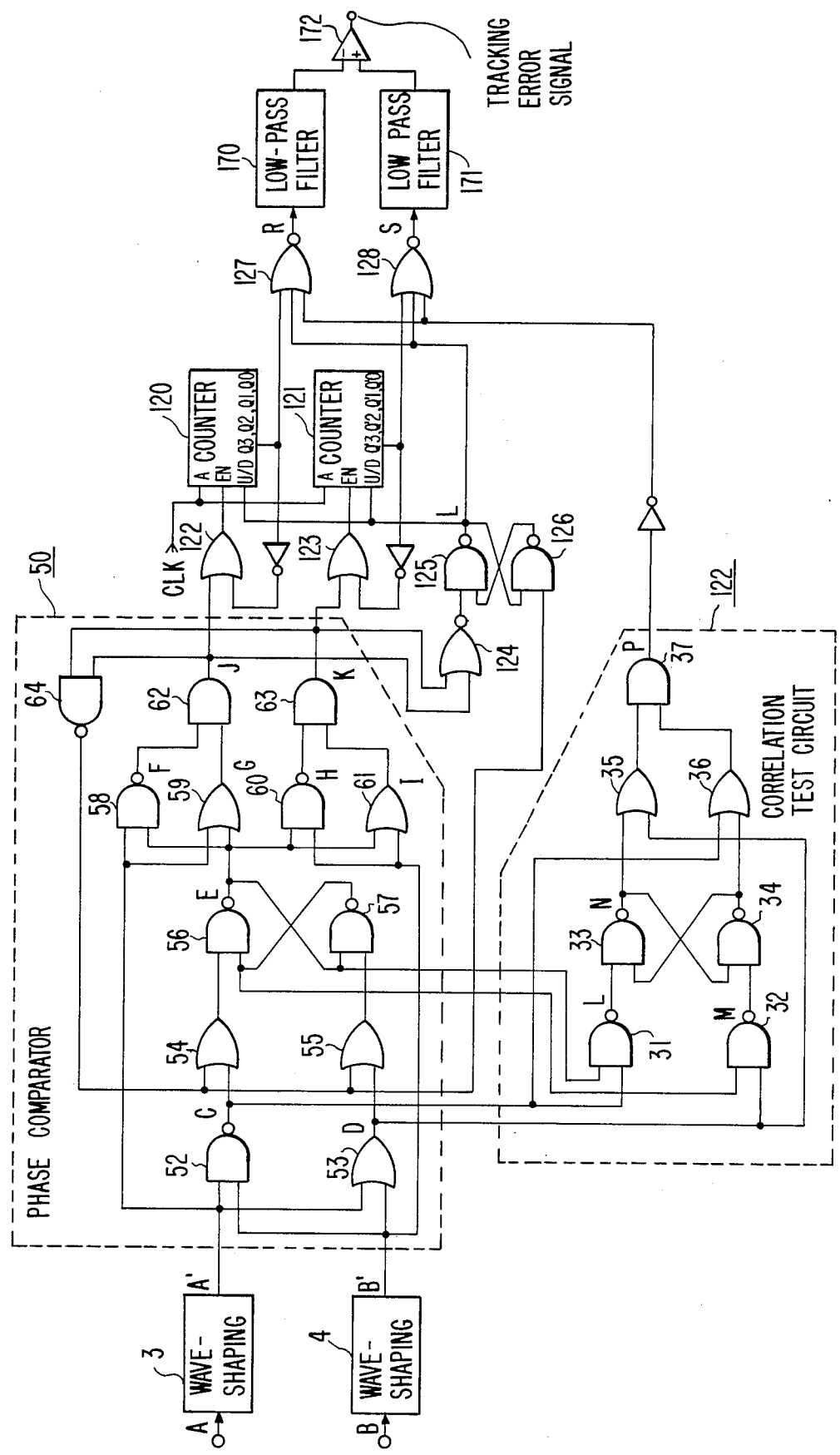
FIG. 8, consisting of A and B, is a circuit diagram of yet another example of the tracking error detecting circuit in the embodiment of FIG. 1.
Figure 9:
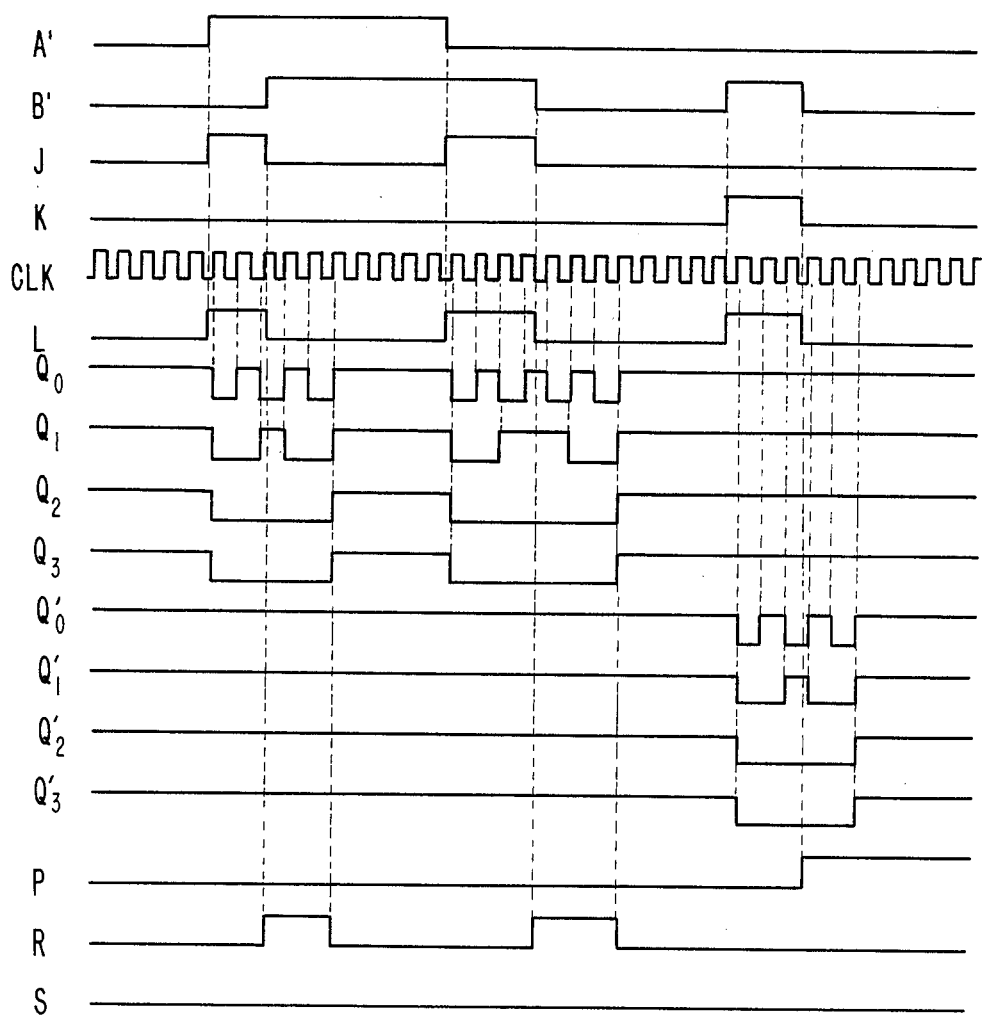
FIG. 9 is a signal waveform diagram for illustrating the operation of the circuit shown in FIG. 8.

In any of the above described tracking error detecting circuits, a value corresponding to the phase difference is temporarily stored as electric charge in a capacitor. But, it is also possible to store the value in a digital form. FIG. 8 shows an example of such a tracking error detecting circuit. In FIG. 8, a phase comparator 50 is the same as the counterpart in FIG. 3. Also, a correlation test circuit 122 is similar to the correlation test circuit 41 shown in FIG. 1. Hence, these will not be described below. FIG. 9 shows waveforms at respective portions in the circuit of FIG. 8. Counters 120 and 121 measure the magnitude of the phase difference and store its value. If the digital detected signal A' leads B', for example, the output signal J of the OR gate 62 is kept in "H" state for the period corresponding to the phase difference. This changes the output signal of an OR gate 122 to "H" state, thereby enabling the counter 120. At the time, the output signal of a NOR gate 124 goes to "L" state, so that a flip-flop consisting of NAND gates 125 and 126 is set, allowing the output signal L of the NAND gate 125 go to "H" state. Thus, the counter 120 is ready to count up, and counts up clock pulses CLK during the period that the signal J stays in "H" state. Subsequently, when the output signal K of the AND gate 63 goes to "H" state, the output signal of the NAND gate 64 becomes "L" state. Immediately thereafter, the signals J and K become "L" states and, at the same time, the flip-flop consisting of the NAND gates 125 and 126 is reset, allowing the signal L go to "L" state. The counter 120 is a 4-bit counter, and its MSB (most significant bit) is $Q_3$. The frequency of the clock pulses CLK is so selected that the highest possible value of the total count obtained by the counter when the phase difference assumes normal values is 7. When both of the signals J and L vary to "L" state, $Q_3$ is usually in "L" state. Accordingly, since the output signal of the OR gate 122 remains in "H" state, the counter 120 is enabled to count down. The counter 120 thus counts down the clock pulses CLK until $Q_3$ reaches "H" state, i.e., the total count reaches $-1$, whereupon the counter stops counting. If there is a correlation between the states of the two digital detected signals A' and B', the output signal P of the AND gate 37 becomes "H" state when the counter 120 is counting down, so that the output signal R of a NOR gate 127 becomes "H" state.

Oppositely, if the signal B' leads A', the counter 121 is enabled by an OR gate 123, and, in the same way as described above, the output signal S of a NOR gate 128 becomes "H" state when the counter 121 is counting down. On the other hand, if there is no correlation between the states of the signals A' and B', the output signal P of the AND gate 37 becomes "L" state. Therefore, the signals R and S remain in "L" state, so that no tracking error signal is produced.

Next, a tracking error detecting circuit that does not use a means for storing the value corresponding to the phase difference will be described. FIG. 10 shows an example of such a circuit. The phase comparator 40 is the same as the counterpart shown in FIG. 1. The correlation test circuit 87 is the same as the counterpart shown in FIG. 5. The phases of the digital detected signals A' and B' are compared after delayed by delay lines 130 and 131, respectively. This makes it possible to check the correlation between the states of the signals A' and B' before the phase comparison is executed. The output signals of the phase comparator 40 are gated by AND gates 132 and 133 responsive to the output signal of the correlation test circuit 87. Hence, it is possible to eliminate the false tracking error signal due to the pseudo phase difference detected when there is no correlation between the states of the signals A' and B'.

Figure 12:
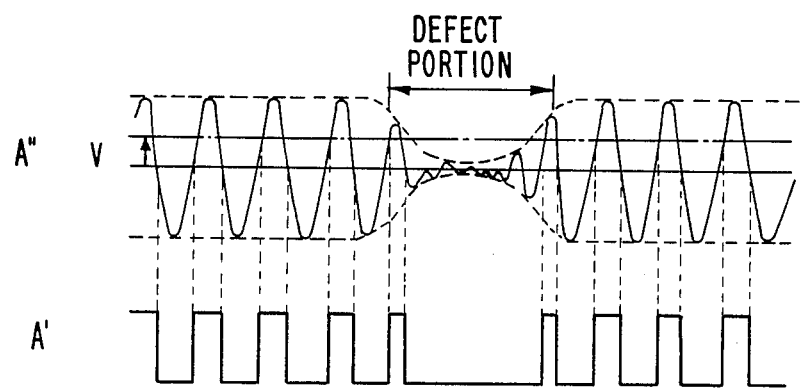
FIG. 12 is a signal waveform diagram for illustrating the operation of the circuit shown in FIG. 11.

Next, a specific configuration of the wave-shaping circuit 3 or 4 will be described. FIG. 11 shows an example of the wave-shaping circuit. A high-pass filter 140 removes lower-frequency components from the detected signal (A or B) delivered from the optical head. A comparator 141 shapes the waveform of the output signal of the high-pass filter 140 by comparing it with a threshold voltage V. FIG. 12 shows the waveforms of the signals derived at this time. When there is a defect on a recording medium and the level of the resultant signal drops, the amplitude of the output signal of the filter 140 drops in a symmetrical relation with respect to an average level as shown in A''. Because the threshold voltage is offset from the ground potential by V, the signal A' obtained by shaping the waveform A'' will not change during the defect portion. Therefore, one of the two digital detected signals A' and B' does not toggle but the other toggles at the defect portion, so that the correlation is lost between the two digital detected signals.

Figure 13:
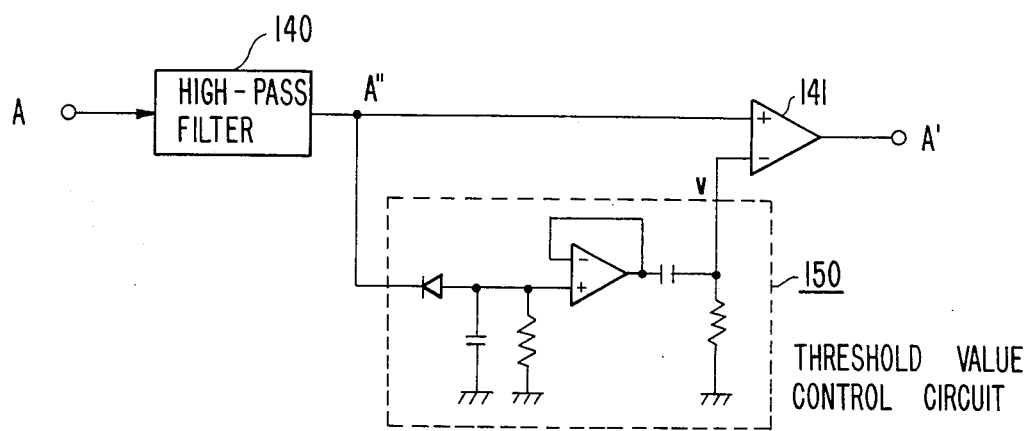
FIG. 13 is a circuit diagram of another wave-shaping circuit used in the above tracking error detecting circuits.
Figure 14:
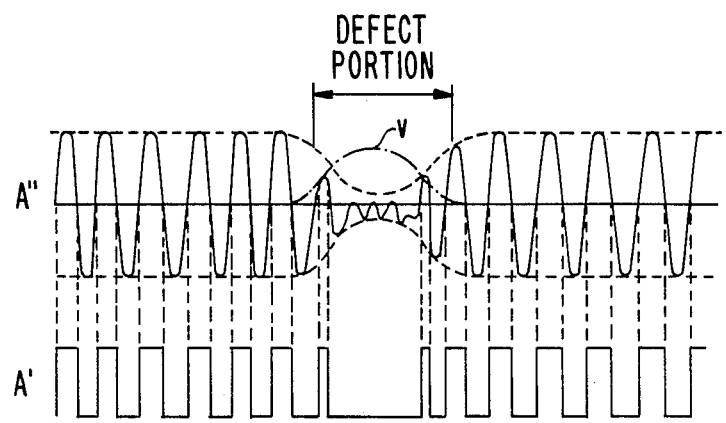
FIG. 14 is a signal waveform diagram for illustrating the operation of the circuit shown in FIG. 13.

FIG. 13 shows another example of the wave-shaping circuit. The high-pass filter 140 and the comparator 141 are the same as their counterparts in FIG. 11. A threshold value control circuit 150 detects the lower envelope of the output signal of the high-pass filter 140 and removes the DC component from the detected envelope thereby to produce a threshold signal v. The waveforms of the signals obtained in this way are shown in FIG. 14. If a portion of the output signal of the optical head is missing due to a defect and the amplitude decreases as shown in A'', the threshold signal v varies as shown at the defect portion. Thus, the digital signal A' does not toggle at the defect portion in the same way as in the case of FIG. 11.

It is to be understood that the phase comparator, the correlation check circuit, and the other circuits in the above examples are taken merely as exemplary. Various modifications and changes may be made thereto as long as they operate on the same principle as described above.

What is claimed is:

1. An optical information read apparatus for optically reading information recorded on a recording medium, comprising:
    an optical head for producing two detected signals whose phases vary according to a tracking error of said optical head;
    a tracking error detecting means for producing a tracking error signal corresponding to a phase difference between said two detected signals; and
    a tracking control means responsive to said tracking error signal for controlling said optical head,
    wherein said tracking error detecting means has a correlation test means for checking a correlation between the states of said two detected signals and makes said tracking error signal substantially invalid when there is no correlation between the states of said two detected signals.

2. The apparatus according to claim 1, wherein said tracking error detecting means further has a wave-shaping means for shaping the waveforms of said two detected signals by comparing the level of each of said two detected signals with a threshold level which is selected to be higher than an abnormally reduced level of each of said two detected signals due to a defect on said recording medium.

3. The apparatus according to claim 2, wherein said wave-shaping means comprises a high-pass filter for removing low-frequency components of each of said two detected signals, and a comparator for comparing the level of an output signal of said high-pass filter with a threshold level offset by a predetermined level from a ground potential.

4. The apparatus according to claim 2, wherein said wave-shaping means comprises a high-pass filter for removing low-frequency components of each of said two detected signals, a threshold value control circuit for producing a threshold signal proportional to an output signal of said high-pass filter and with its low-frequency components removed, and a comparator for comparing the output signal of said high-pass filter with said threshold signal.

5. An optical information read apparatus for optically reading information recorded on a recording medium, comprising:
    an optical head for producing two detected signals whose phases vary according to a tracking error of said optical head;
    a tracking error detecting means for producing a tracking error signal corresponding to a phase difference between said two detected signals; and
    a tracking control means responsive to said tracking error signal for controlling said optical head,
    wherein said tracking error detecting means has a correlation test means for checking a correlation between the states of said two detected signals, and a storage means for temporarily storing a value corresponding to the phase difference between said two detected signals and outputting said tracking error signal corresponding to said value only when there is a correlation between the states of said two detected signals.

6. The apparatus according to claim 5, wherein said storage means comprises a capacitor for storing electric charges corresponding to a time difference between a transition of one of said two detected signals and a transition of the other, and wherein said tracking error detecting means outputs said tracking error signal according to a time period in which said capacitor discharges said electric charges.

7. The apparatus according to claim 5, wherein said storage means comprises a counter for counting up clock signals during a time period corresponding to a time difference between a transition of one of said two detected signals and a transition of the other, and wherein said tracking error detecting means outputs said tracking error signal according to a time period in which said counter counts down said clock signals to an initial value.

8. The apparatus according to claim 5, wherein said tracking error detecting means further has a wave-shaping means for shaping the waveforms of said two detected signals by comparing the level of each of said two detected signals with a threshold level which is selected to be higher than an abnormally reduced level of each of said two detected signals due to a defect on said recording medium.

9. The apparatus according to claim 8, wherein said wave-shaping means comprises a high-pass filter for removing low-frequency components of each of said two detected signals, and a comparator for comparing the level of an output signal of said high-pass filter with a threshold level offset by a predetermined level from a ground potential.

10. The apparatus according to claim 8, wherein said wave-shaping means comprises a high-pass filter for removing low-frequency components of each of said two detected signals, a threshold value control circuit for producing a threshold signal proportional to an output signal of said high-pass filter and with its low-frequency components removed, and a comparator for comparing the output signal of said high-pass filter with said threshold signal.

11. An optical information read apparatus for optically reading information recorded on a recording medium, comprising:
    an optical head for producing two detected signals whose phases vary according to a tracking error of said optical head;
    a tracking error detecting means for producing a tracking error signal corresponding to a phase difference between said two detected signals; and
    a tracking control means responsive to said tracking error signal for controlling said optical head,
    wherein said tracking error detecting means has a correlation test means for checking a correlation between the states of said two detected signals, and a storage means for temporarily storing said tracking error signal corresponding to the phase difference between said two detected signals and outputting said stored tracking error signal only when there is a correlation between the states of said two detected signals, said stored tracking error signal being cancelled when there is no correlation between the states of said two detected signals.

12. The apparatus according to claim 11, wherein said storage means comprises a capacitor for temporarily storing said tracking error signal, and a switch means responsive to an output signal of said correlation test means for cancelling said stored tracking error signal when there is no correlation between the states of said two detected signals.

13. The apparatus according to claim 11, wherein said tracking error detecting means further has a wave-shaping means for shaping the waveforms of said two detected signals by comparing the level of each of said two detected signals with a threshold level which is selected to be higher than an abnormally reduced level of each of said two detected signals due to a defect on said recording medium.

14. The apparatus according to claim 13, wherein said wave-shaping means comprises a high-pass filter for removing low-frequency components of each of said two detected signals, and a comparator for comparing the level of an output signal of said high-pass filter with a threshold level offset by a predetermined level from a ground potential.

15. The apparatus according to claim 13, wherein said wave-shaping means comprises a high-pass filter for removing low-frequency components of each of said two detected signals, a threshold value control circuit for producing a threshold signal proportional to an output signal of said high-pass filter and with its low-frequency components removed, and a comparator for comparing the output signal of said high-pass filter with said threshold signal.

16. An optical information read apparatus for optically reading information recorded on a recording medium, comprising:
   an optical head for producing two detected signals whose phases vary according to a tracking error of said optical head;
   a tracking error detecting means for producing a tracking error signal corresponding to a phase difference between said two detected signals; and
   a tracking control means responsive to said tracking error signal for controlling said optical head,
   wherein said tracking error detecting means comprises:
   a phase comparison means for comparing the phases of said two detected signals and producing a phase difference signal between said two detected signals;
   a means for producing said tracking error signal according to said phase difference signal; and
   a correlation test means for checking a correlation between the states of said two detected signals,
   said phase comparison means being responsive to an output signal of said correlation test means for making said phase difference signal substantially invalid when there is no correlation between the states of said two detected signals.

17. The apparatus according to claim 16, wherein said phase comparison means has a storage means for temporarily storing said phase difference signal corresponding to a time difference between a transition of one of said two detected signals and a transition of the other.

18. The apparatus according to claim 16, wherein said tracking error detecting means further has a wave-shaping means for shaping the waveforms of said two detected signals by comparing the level of each of said two detected signals with a threshold level which is selected to be higher than an abnormally reduced level of each of said two detected signals due to a defect on said recording medium.

19. The apparatus according to claim 18, wherein said wave-shaping means comprises a high-pass filter for removing low-frequency components of each of said two detected signals, and a comparator for comparing the level of an output signal of said high-pass filter with a threshold level offset by a predetermined level from a ground potential.

20. The apparatus according to claim 18, wherein said wave-shaping means comprises a high-pass filter for removing low-frequency components of each of said two detected signals, a threshold value control circuit for producing a threshold signal proportional to an output signal of said high-pass filter and with its low-frequency components removed, and a comparator for comparing the output signal of said high-pass filter with said threshold signal.

21. An optical information read apparatus for optically reading information recorded on a recording medium, comprising:
   an optical head for producing two detected signals whose phases vary according to a tracking error of said optical head;
   a tracking error detecting means for producing a tracking error signal corresponding to a phase difference between said two detected signals; and
   a tracking control means responsive to said tracking error signal for controlling said optical head,
   wherein said tracking error detecting means comprises:
   a phase comparison means for comparing the phases of said two detected signals and producing a phase difference signal between said two detected signals;
   a correlation test means for checking a correlation between the states of said two detected signals, and
   means responsive to an output signal of said correlation test means for producing said tracking error signal according to said phase difference signal only when there is a correlation between the states of said two detected signals.

22. The apparatus according to claim 21, wherein said means responsive to the output signal of said correlation test means comprises a storage means for temporarily storing said phase difference signal, and a gate means responsive to the output signal of said correlation test means for gating an output signal of said storage means.

23. The apparatus according to claim 22, wherein said storage means comprises a capacitor for storing electric charges corresponding to said phase difference signal.

24. The apparatus according to claim 22, wherein said storage means comprises a counter for counting up clock signals during a time period corresponding to said phase difference signal.

25. The apparatus according to claim 21, further comprising a delay means for delaying said two detected signals before applied to said phase comparison means.

26. The apparatus according to claim 21, wherein said tracking error detecting means further has a wave-shaping means for shaping the waveforms of said two detected signals by comparing the level of each of said two detected signals with a threshold level which is selected to be higher than an abnormally reduced level of each of said two detected signals due to a defect on said recording medium.

27. The apparatus according to claim 26, wherein said wave-shaping means comprises a high-pass filter for removing low-frequency components of each of said two detected signals, and a comparator for comparing the level of an output signal of said high-pass filter with a threshold level offset by a predetermined level from a ground potential.

28. The apparatus according to claim 26, wherein said wave-shaping means comprises a high-pass filter for removing low-frequency components of each of said two detected signals, a threshold value control circuit for producing a threshold signal proportional to an output signal of said high-pass filter and with its low-frequency components removed, and a comparator for comparing the output signal of said high-pass filter with said threshold signal.

* * * * *